(12) United States Patent  
Daugherty et al.

(10) Patent No.: US 7,187,598 B1
(45) Date of Patent: Mar. 6, 2007

(54) DEVICE HAVING AN INTERFACE AND METHOD THEREOF

(75) Inventors: Daniel E. Daugherty, Loveland, CO (US); Ronald Scott Hathcock, Longmont, CO (US); Steven J. Kommrusch, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 26 days.

(21) Appl. No.: 11/098,873

(22) Filed: Apr. 5, 2005

(51) Int. Cl.
*G11C 7/00* (2006.01)
(52) U.S. Cl. ........................ 365/194; 365/233
(58) Field of Classification Search .............. 365/194, 365/233, 193; 713/500
See application file for complete search history.

(56) References Cited

U.S. PATENT DOCUMENTS 6,889,334 B1 * 5/2005 Magro et al. ............... 713/500
6,940,768 B2 * 9/2005 Dahlberg et al. ........... 365/201

OTHER PUBLICATIONS

Lau, William, "Design Feature: Overcoming DDR-2-Interface Challenges," LSI Logic, pp. 71-74, <http://www.edn.com>>, Jan. 22, 2004.

* cited by examiner

*Primary Examiner*—Vu A. Le (57) ABSTRACT

A system device receives a first data signal and a first strobe signal from a dual-data-rate (DDR) memory. A first delay value representative of a delay to a predetermined phase location of the first strobe signal is determined. The first delay is adjusted based on a first offset value to generate a first adjusted delay value used to delay the first strobe signal. A first edge of a first pulse of the first delayed strobe signal is used to latch a first data value of the first data signal.

19 Claims, 5 Drawing Sheets

FIG. 10

DEVICE HAVING AN INTERFACE AND METHOD THEREOF

BACKGROUND

1. Field of the Disclosure

The present disclosure relates generally to integrated circuit devices, and more particularly to a method for interfacing to memory and devices thereof.

2. Description of the Related Art

High-speed memory interfaces are sensitive to operating conditions such as variations in voltage, temperature, and device performance. Changes in these parameters can cause sufficient variations in timing that corrupt data transferred to and from memory. A device and method operable to compensate for such variations would be useful.

BRIEF DESCRIPTION OF THE DRAWINGS

The present disclosure may be better understood and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
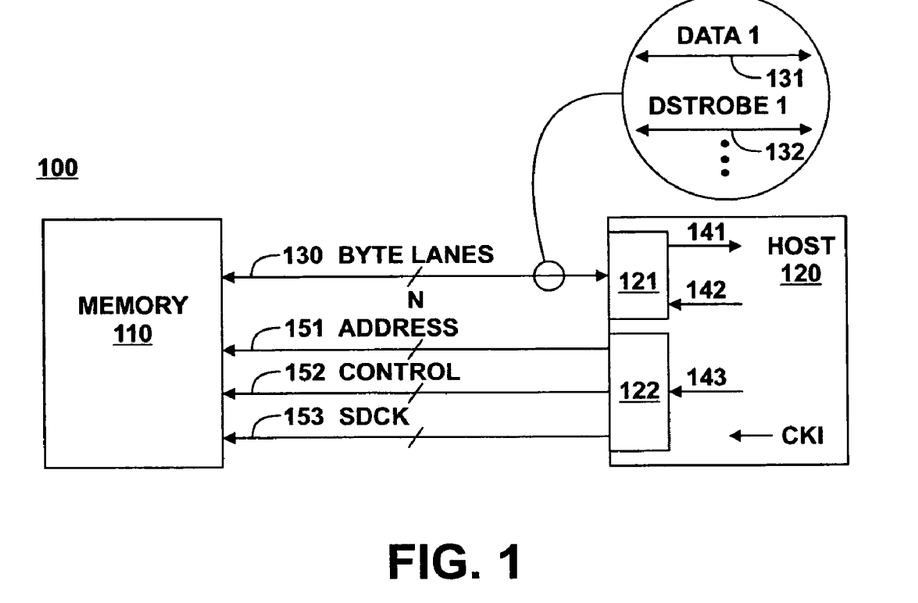
FIG. 1 illustrates, in block diagram form, a system comprising a host device and a memory device.

In accordance with a specific embodiment of the present disclosure, a device receives a first data signal and a first strobe signal from a dual data rate (DDR) memory. A first delay value representative of a delay to a predetermined phase location of the first strobe signal is determined. The first delay is adjusted based on a first offset value to generate a first adjusted delay value used to delay the first strobe signal. A first edge of a first pulse of the first delayed strobe signal is used to latch a first data value of the first data signal. The ability to adjust the first delay by an offset value allows for an improved interface to a memory portion of a system FIG. 1 illustrates a block diagram of a data processing system 100 in accordance with a specific embodiment of the present disclosure. System 100 includes a host 120 and a memory 110. The host 120 is a data processor that may be application specific or general purpose in nature. Typical examples of data processors include microprocessors and microcontrollers. Memory 110 supports high data transfer rates and typically includes one or more double-data-rate (DDR) memory devices that are operable to transmit and receive data on rising and falling strobe edges.

Host 120 provides data access information to memory 110 over control signals 152 (CONTROL) to indicate a data transfer type, i.e., data read or write, chip select information, and various address strobes, as needed, to facilitate data transfers between memory 110 and host 120 over byte lanes 130. Address signal 151 (ADDRESS) includes a plurality of bits that identify data locations within memory 110. Strobe signal 152 (SDCK) provides a plurality of pulses to memory 110 used to qualify address signal 151, and can be used by memory 110 to as the basis to generate an internal clock.

In operation, data information is transferred bi-directionally between memory 110 and Host 120 over a plurality of byte lanes 130. Each byte lane operates simultaneously with each other byte lane and includes a multi-bit data signal and a strobe signal. Specifically illustrated at FIG. 1 are strobe signal 132 (DSTROBE1) and data signal 131 (DATA1), which correspond to one byte lane of the plurality of byte lanes 130. It will be appreciated that the term byte lane is used herein generally to refer to a data and strobe signal combination, and that the data signal of a byte lane can have any number of bits of data, but typically has a number of bits that is an integer multiple of eight (8).

Figure 2:
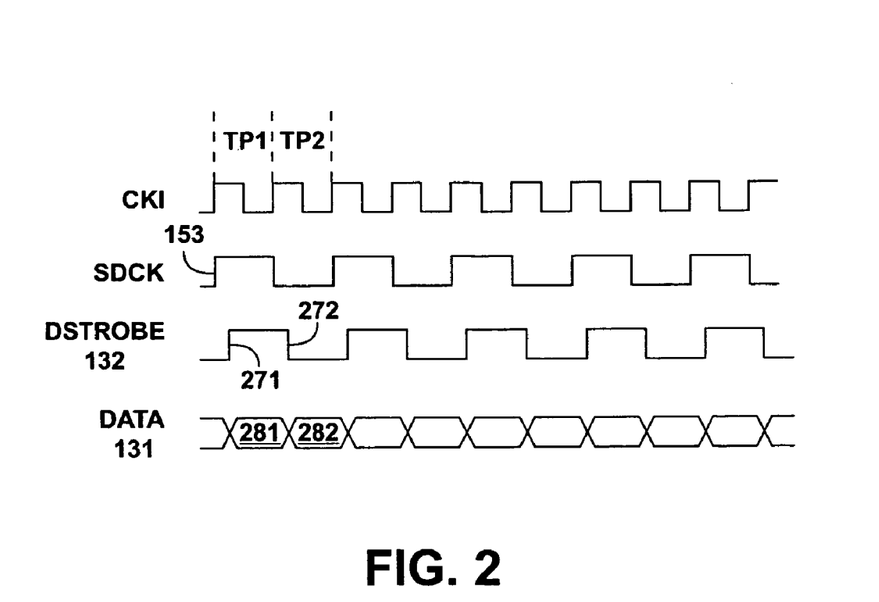
FIGS. 2 and 4 illustrate a timing diagram of various signals of FIG. 1.
Figure 4:
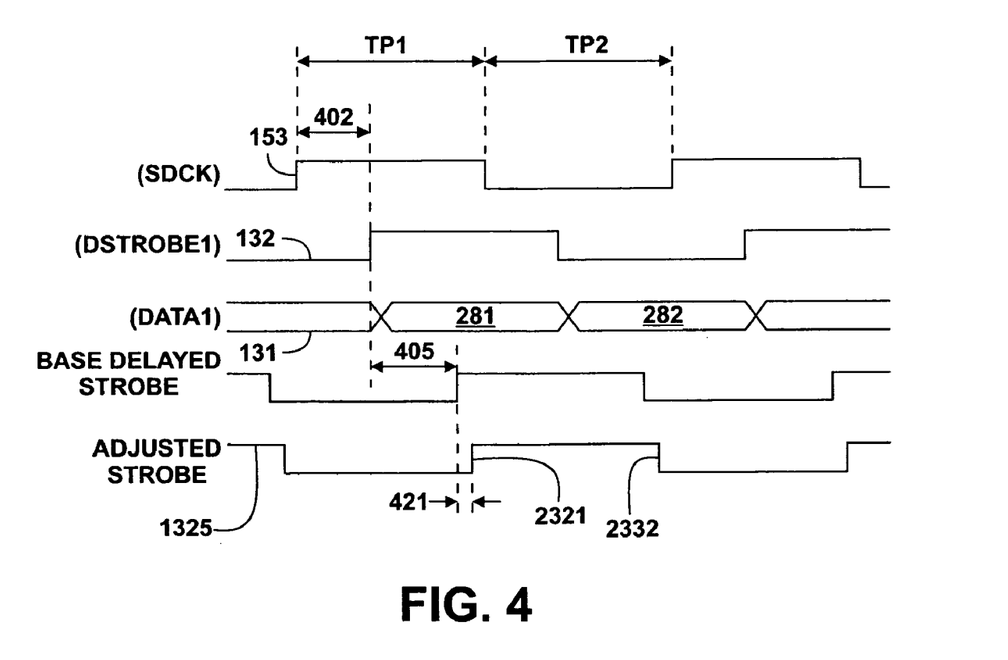

Strobe signal 132 comprises a series of pulses indicative of data transitions on data signal 131, as indicated in the timing diagram of FIG. 2. Specifically, FIG. 2 illustrates data signal 131 transitioning to value 281 on the rising edge 271 of a strobe signal 132 pulse and transitioning to value 282 on the falling edge 272 of the same pulse. Based upon the timing relationship between the strobe signal edges 132 and data signal 131, both of which are provided by the device transmitting information, a receiving device can properly latch information values of data signal 131. Note that strobe signal 132 illustrated in FIG. 2 is received at host 120 and typically is asynchronous of the host 120 system clock (CKI), as illustrated in FIGS. 2 and 4.

A portion 121 of host 120 conditions the received strobe signal 132 so that information of data signal 131 can be reliably latched on both rising and falling edges of strobe signal 132. In one embodiment, portion 121 allows for strobe signal 132 to be delayed by a base delay amount and an offset value, where the base delay amount is a predetermined delay amount applied to the strobe signal 132 to facilitate the reliable latching of information on data signal 131 based on strobe signal 132 edge locations. The predetermined delay amount will generally be selected to be optimal for a typical system, however, in accordance with a specific embodiment herein the base delay amount is further adjusted by an offset value as needed to compensate for system variations. Because system variations can be caused by different system characteristics, the ability to adjust the base delay allows for greater control and flexibility by host 120 to receive information received from memory 110.

Portions 121 and 122 of host 120 can also condition output signals sent to memory 110 by providing an offset delay to transmitted signals. Such offset delays are useful to compensate for variations in timing requirements amongst systems and for controlling electromagnetic interference (EMI) of the system 100. Various embodiments of the present disclosure will be better understood with reference to FIGS. 2–9 discussed further herein.

As described above, FIG. 2 is a timing diagram illustrating various signals in accordance with the present disclosure. In addition to strobe signals 132 and 153, and data signal 131, which were described previously, FIG. 2 illustrates an internal clock CKI of host 120, from which strobe signal 153 is generated. In the specific embodiment illustrated, strobe signal 153 has a period twice that of internal clock CKI.

Figure 3:
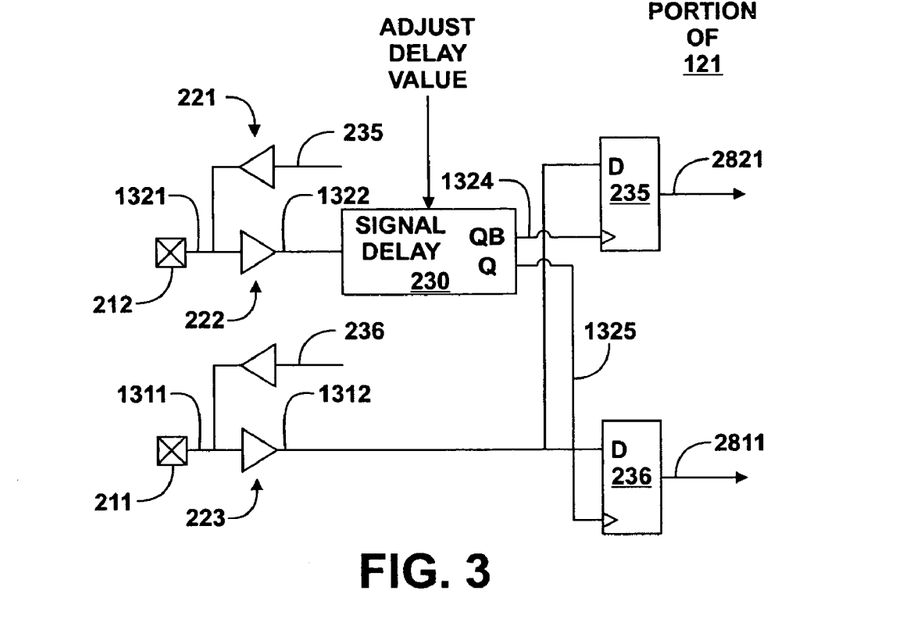
FIG. 3 illustrates, in block diagram form, a portion of the host device for receiving information.

FIG. 3 illustrates a specific implementation of portion of 121 for receiving data lane information from memory 110. FIG. 3 illustrates an input pad 211 that receives one bit of the plurality of bits of the data signal 131. The received bit signal, labeled 1311, is provided to input buffer 223, which provides bit signal 1312 to data inputs of latches 235 and 236. Note, that for reference purposes, a signal's reference number is appended with an additional digit as the signal transitions through various elements. For example, signals 1311 and 1312 both represent signal 131 at different locations of FIG. 3, one before an input buffer and one after. It will be appreciated that bit signals 1311 and 1312 are representative of data transmitted over one bit of data signal 131 and that components 211, 223, 235 and 236 are duplicated for each additional data bit of a byte lane.

The illustrated portion 121 in FIG. 3 further includes input pad 212 that is connected to the memory 110 to receive strobe signal 132 during data reception by host 120. The received strobe signal 1321 is provided to buffer 222, which provides signal 1322 to an input of signal delay module 230. Signal delay module 230 delays signal 1322 by an amount based upon a received adjusted delay value (ADJUSTED DELAY VALUE) to generate delayed signals 1324 and 1325. While signals 1324 and 1325 are both delayed representations of signal 1322, signal 1324 is further an inverted representation of signal 1322. Signal 1324 is provided to a latch control input of latch 235 and signal 1325 is provided to a latch control input of latch 326 to facilitate latching information transmitted by data signal 131 at different times. Operation of the block diagram of FIG. 3 will be better understood with reference to FIG. 4.

FIG. 4 illustrates a portion of the timing diagram of FIG. 2 in greater detail that includes time periods TP1 and TP2. FIG. 4 specifically illustrates strobe signal 132 offset from strobe signal 153 by time 402. In an asynchronous system the offset time 402 is typically the result of pulses of strobe signal 132 being generated non-deterministically relative to pulses of strobe 153. In a synchronous system, the time 402 is typically skew introduced by various elements of the system.

FIG. 4 illustrates the timing relationship between data signal 131 and strobe signal 132, whereby values of the data lane information transmitted over the data signal 131 changes at each pulse edge of strobe signal 132. For example, transmission of information value 281 onto data signal 131 corresponds with a rising edge of strobe signal 132 and transmission of information value 282 onto data signal 131 corresponds with a falling edge of strobe signal 132, such that two information values are transmitted for each cycle of data signal 131.

In accordance with a specific embodiment of the present disclosure, a base delay value is determined that represents an amount of delay that each edge of the strobe signal 132 should be delayed that corresponds to a predetermined phase location where information on data signal 131 is to be latched. For example, a 90-degree phase location of the strobe 132 is at or near the center of each transmitted information value. Therefore, delaying the edges of strobe signal 132 by a value representative of a delay to the 90-degree phase location of the strobe signal 132, results in the strobe signal labeled BASE DELAYED STROBE being generated as illustrated in FIG. 4.

Next, the BASE DELAYED STROBE is adjusted by a delay represented by an offset value to generate the ADJUSTED DELAY VALUE that is provided to the delay module 230 of FIG. 3, which in response provides the delayed strobe signals 1324 and 1325 to the latch control inputs of latches 235 and 236, respectively. Rising edges of signal 1325 result in the latching of information from data signal 1312. For example, signal 2811 at the output of latch 236 is representative of the information 281 of signal 131 after being latched by a rising edge 2321 of signal 1325, and the signal 2821 at the output of latch 235 is representative of the information 282 of signal 131 after being latched by a rising edge of signal 1324, which corresponds to the falling edge 2332 of signal 1325.

Allowing for a base delay value to be adjusted by an offset value is advantageous because it allows for greater flexibility when interfacing to high performance memory devices. For example, assume that the base delay value is determined for typical system timing and represents a phase shift of strobe signal 132 to facilitate latching of data signal 131 in a typical system at a 90-degree phase location. However, when an actual system's timing is not typical due to one or more processing system characteristics, the base delay value 315 can be adjusted by the offset value to compensate for the non-typical characteristics thereby adjusting the latching location.

Figure 5:
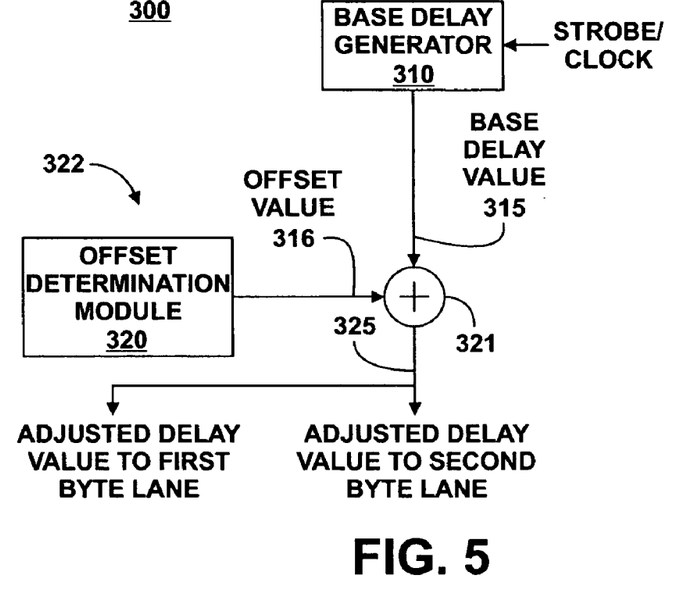
FIGS. 5–7 illustrate, in block diagram form, various embodiments of a delay generator of the host device.
Figure 6:
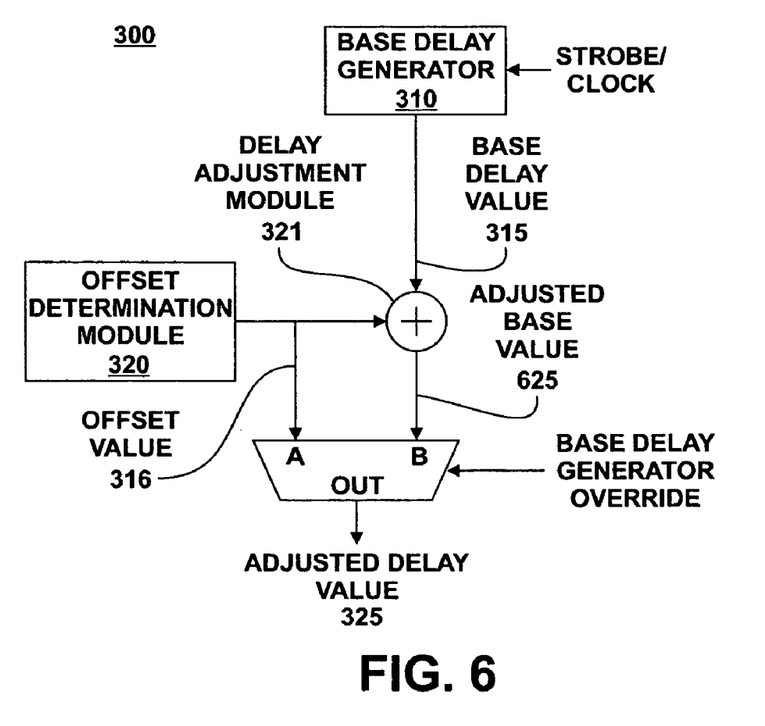

FIG. 5 illustrates a block diagram representing a specific embodiment of a delay calculation module 300 that determines the ADJUSTED DELAY VALUE provided to the signal delay module 230 of FIG. 3. Delay calculation module 300 includes a base delay generator 310, and a delay adjustment module 322 that includes adder 321 and offset determination module 320.

In operation, base delay generator 310 determines a base delay value 315 that identifies a delay amount corresponding to a predetermined phase location of the strobe signal 132 (FIG. 1) as previously described. In one embodiment the base delay value is determined directly from the strobe signal 132. In an alternate embodiment, the base delay value 315 is determined from an alternate signal. For example, strobe signal 153 can be used to determine the base delay value 315 in place of strobe signal 132 if there is a known relationship between the two signals. In one embodiment signals 132 and 153 have a common frequency and duty cycle because memory 110 generates its internal clock based on strobe signal 153 (FIG. 1). As illustrated in FIG. 2, strobe signal 153 is generated from system clock CKI, thereby allowing either strobe signal 153 or system clock CKI to be used to determine the base delay value.

In accordance with a specific embodiment of the present disclosure, the base delay value 315 is a digital value representing a number of series delay elements used to implement delay 405 (see FIG. 4). In one embodiment, a delay locked loop (DLL) can be used to determine the base delay value 315, which can vary based upon variable system characteristics, such as processing, temperature, voltage, and other system specific features.

The base delay value 315 is adjusted by an offset value 316 at adder 321, where the offset value 316 is provided from offset determination module 320. In one embodiment, the offset determination module 320 determines the offset value 321 by accessing a single register location. In an alternate embodiment the offset determination module 320 determines the offset value 321 based upon one or more processing system characteristics. For example, a set of offset delay values can be stored that are indexed by the offset determination module 320 based upon one or more processing system characteristics. The processing system characteristics can include static system information, information provided by a user, information dynamically determined during system configuration (e.g. startup), or dynamically determined periodically during operation of the system 100. Examples of processing system characteristics include system specific characteristics such as memory configuration information, and device specific characteristics such as device performance, operating voltage, and operating temperature information. The set of offset values that are indexed based upon the processing system characteristics, can be determined empirically or by any other means. In one embodiment, the first offset value is determined based on an empirical analysis of a performance of data signal 131 and strobe signal 132.

Adjusting the base delay value 315 by offset value 316 allows for greater interface flexibility to high performance memory devices. For example, assume that the base delay value 315 is determined for a typical system and represents a phase shift of strobe signal 132 to facilitate optimal latching of data signal 131 in a typical system. However, when a specific system does not have typical characteristics, based upon one or more processing system characteristics, the base delay value 315 can be adjusted by the offset value 316 to compensate for this discrepancy. For example, if a memory 110 of system 100 has more banks of memory than a typical system, the base delay value 315 can be increased or decreased by an offset value 316 found to compensate for signal effects caused by the additional banks of memory, thereby improving performance of the system 100. Similarly, if the actual speed of device 120 is determined to be faster or slower than the typical device speed, the base delay value 315 can be adjusted by the offset value 316 to compensate for the device's actual speed.

Figure 7:
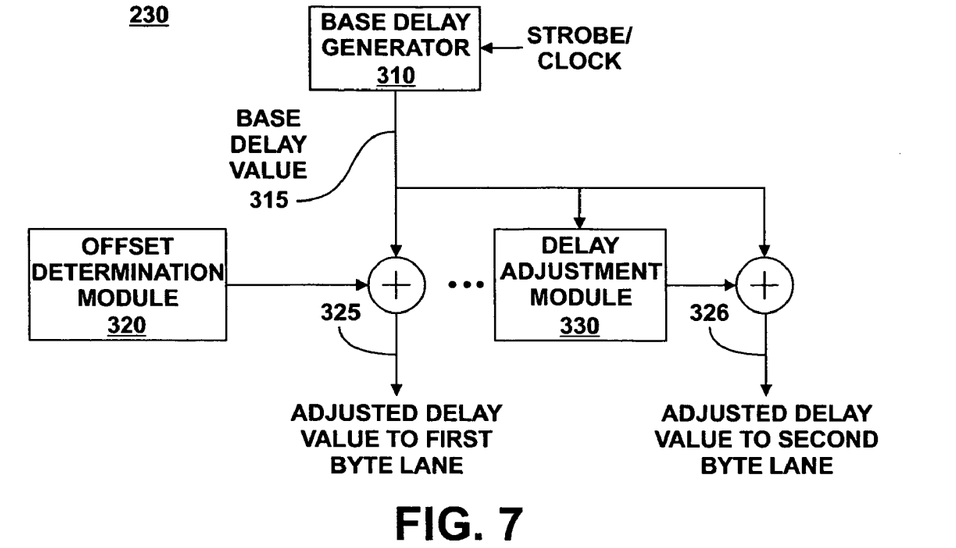

The specific embodiment of FIG. 5 provides the same ADJUSTED DELAY VALUE to delay the strobe signal of each byte lane of the plurality of byte lanes of a system. A specific embodiment of delay calculation module 300 illustrated in FIG. 6 allows for either an adjusted base value 625 from the adder 321, or the offset value 316 to be provided as the ADJUSTED DELAY VALUE that is provided to the signal delay module of the byte lanes, i.e., delay module 230 (FIG. 3). The embodiment of FIG. 6 allows for an ADJUSTED DELAY VALUE to be SPECIFICALLY INDICATED by loading the desired value to a register of the delay adjustment module 320, and controlling a value of the signal labeled BASE DELAY GENERATOR OVERRIDE to select the register value directly, thereby overriding use of the base delay generator 310. Another specific embodiment of delay calculation module 300 is illustrated in FIG. 7, which allows for the base delay value 315 to be adjusted independently for each byte lane through the use of a plurality of delay adjustment modules including delay adjustment module 330 which provides an offset value to adder 326. Thereby allowing a different ADJUSTED DELAY VALUE to be provided to each byte lane.

Figure 8:
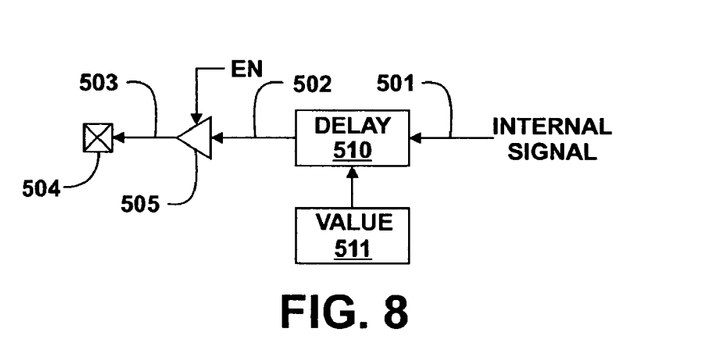
FIGS. 8 and 9 illustrate, in block diagram form, various embodiments of a portion of the host device for sending information.

FIG. 8 illustrates portions of host 120 that facilitate offsetting output signals provided by host 120 by a delay amount corresponding to a phase shift of the output signal. Specifically, an internal signal 501, such as a data signal, strobe signal, control signal, or address signal, of host 120 is received at delay element 510. Delay element 510 delays signal by an amount specified by a value stored in register 511 to provide signal 502. Signal 502 is provided to output buffer 505, which in turn provides signal 503 to output pad 504. Output pad 504 provides the signal 503 external device 120. Using the structure of FIG. 8, each output signal from device 120 can have its own delay element and receive an offset value to facilitate small delay changes corresponding to shifts in phase to accommodate timing variations in system characteristics, as previously discussed, or to address EMI concerns as necessary. The delay element 510 can include a selectable number of elements operably connected in series to provide the delay.

Figure 9:
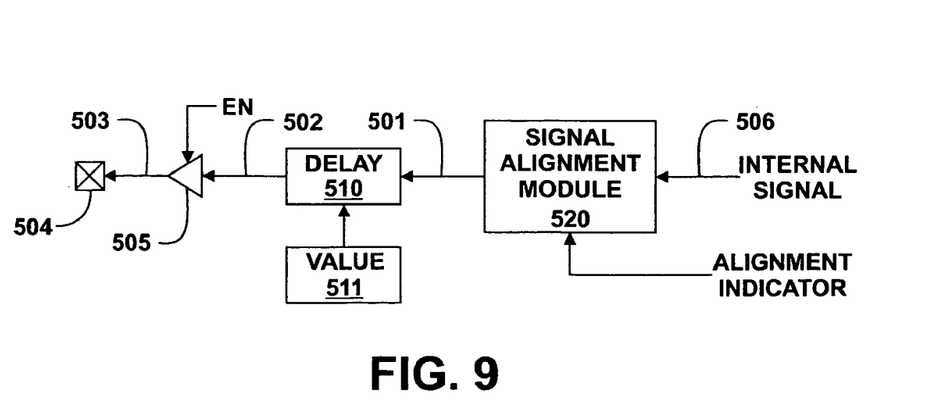

FIG. 9 illustrates an alternate embodiment of portions of host 120 that facilitate offsetting output signal provided by host 120 that is similar to the embodiment of FIG. 8. FIG. 9, however, provides an internal signal 506 to a signal alignment module 520 that can align, or otherwise adjust, the signal 506 relative to other signals before providing an adjusted signal 501 to the delay portion 510 as previously discussed. In one embodiment, the internal signal 506, such as a strobe signal, can be inverted or phase shifted based upon a received alignment indicator (ALIGNMENT INDICATOR).

Figure 10:
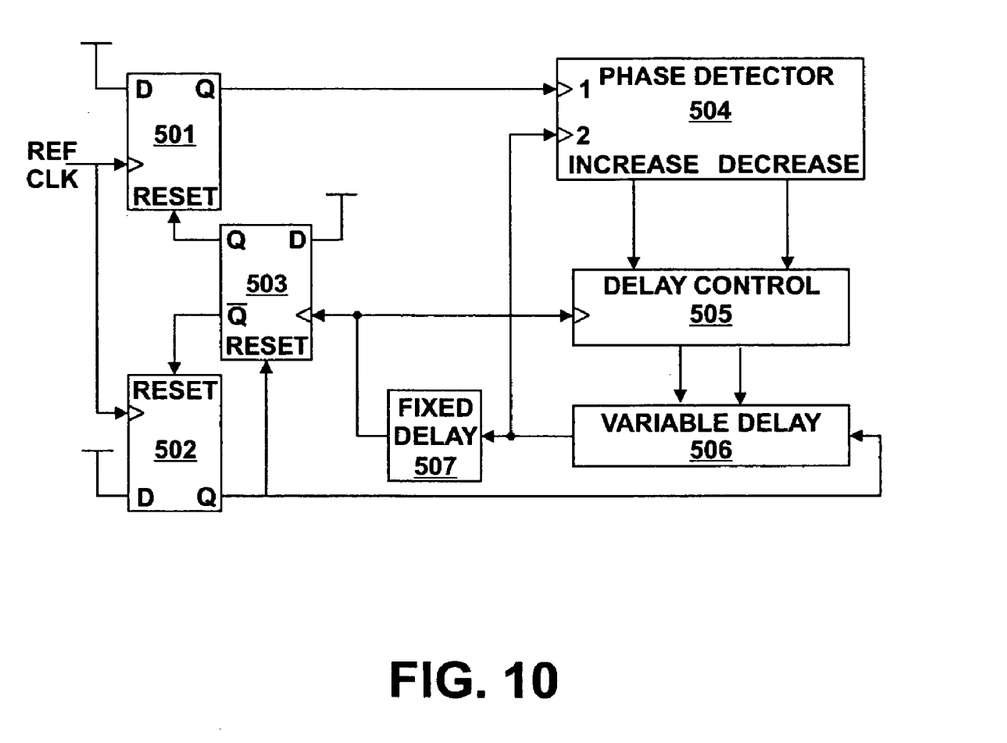
FIGs 10 illustrates, in block diagram form, an implementation for determining base delay values.

FIG. 10 illustrates a block diagram of a specific implementation for determining the base delay values. Specifically, a reset state of the block diagram of FIG. 10 is such that latch 503 is enabled, latch 502 is in reset, and latch 501 is in reset. A rising edge of RefClk (i.e. STROBE/CLOCK from FIG. 6) will result in the output of latch 502 transitioning high, which resets latch 503. An amount of time later, based upon propagation time through latches 502 and 503, latch 502 will be reset causing the output of latch 502 to transition low thereby generating the falling edge of a pulse. The reset of latch 503 also activates latch 501 allowing a next rising edge of RefClk to be provided to the phase detector 504 which will compare the relationship of the next RefClk edge to the pulse generated from latch 502.

The PULSE generated at the output of latch 502 is now traveling through a variable delay 506 that provides a delay amount controlled by a values stored at delay control 505. Two outcomes are possible. In the first outcome, PULSE exits the 506 before the next RefClk arrives, in which case Phase Detector 504 will assert a signal to increase an amount of delay to be produced by variable delay 506. The increase signal from the phase detector 504 is clocked into delay control 505 by the a signal delayed from fixed delay portion 507, note that delay portion 507 provides additional delay to the pulse from latch 502 to allow the Phase Detector 504 time to settle. The delayed pulse signal from 507 also clocks latch 503, thereby placing the block diagram in its reset state as described above.

In the second outcome, RefClk arrives at phase detector 504 before the pulse signal generated at latch 502. As a result, the Phase Detector 504 will generate a decrease (delay) signal. When PULSE exits the variable delay 506 it has an additional delay provided by delay element 507, as discussed above, which latches the affects of the decrease signal into delay control 505. The delayed pulse signal from 507 also clocks latch 503, thereby placing the block diagram of FIG. 10 in its reset state described above.

This implementation assures that only a single pulse is ever in the variable delay element 506 at a time. This avoids locking onto a harmonic of the RefClk.

In the preceding detailed description, reference has been made to the accompanying drawings that form a part hereof, and in which are shown by way of illustration specific embodiments in which the invention may be practiced. These embodiments and certain variants thereof, have been described in sufficient detail to enable those skilled in the art to practice the invention. It is to be understood that other suitable embodiments may be utilized. In addition, it will be appreciated that the functional portions shown in the figures could be further combined or divided in a number of manners without departing from the spirit or scope of the invention. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method comprising:
   receiving a first data signal from a dual data rate (DDR) memory;
   receiving a first strobe signal from the DDR memory;
   determining a first delay value representative of a delay to a predetermined phase location of the first strobe signal;
   adjusting the first delay value based on a first offset value to generate a first adjusted delay value;
   delaying the first strobe signal based on the first adjusted delay value; and
   using a first edge of a first pulse of the first delayed strobe signal to latch a first data value of the first data signal.

2. The method of claim 1, further comprising:
   using a second edge of the first pulse of the first delayed strobe signal to latch a second data value of the first data signal.

3. The method of claim 1, further comprising:
   receiving a second data signal from the DDR memory substantially simultaneously with receiving the first data signal;
   receiving a second strobe signal from the DDR memory;
   delaying the second strobe signal based on the first adjusted delay value; and
   using a first edge of a first pulse of the second delayed strobe signal to latch a first data value of the second data signal.

4. The method of claim 1, further comprising:
   receiving a second data signal from the DDR memory;
   receiving a second strobe signal from the DDR memory;
   determining a second delay value representative of a delay to a predetermined phase location of the second strobe signal;
   adjusting the second delay value based on a second offset value to generate a second adjusted delay value;
   delaying the second strobe signal based on the second adjusted delay value; and
   using a first edge of a first pulse of the second delayed strobe signal to latch a first data value of the second data signal.

5. The method of claim 1, wherein the first delay value is representative of a first number of delay elements in series and the adjusted delay value is representative of a second number of delay elements in series, and the offset value is representative of a difference between the first number and the second number.

6. The method of claim 5, wherein delaying the strobe signal based on the first adjusted delay value includes providing the strobe signal to a series of N delay elements, wherein N is an integer based upon the first adjusted delay value.

7. The method of claim 1, further comprising:
   determining a second delay value representative of a first phase shift;
   adjusting a first signal based on the second delay to generate a first delayed signal; and
   transmitting the first delayed signal to DDR memory.

8. The method of claim 7, wherein the first signal includes at least one of a second strobe signal, a data signal and a control signal.

9. The method of claim 1, wherein the first offset value is determined based on an empirical analysis of a performance of the first strobe signal and the first data signal.

10. A method comprising:
    providing a set of offset values indexed to a plurality of processing system characteristic sets;
    determining a first processing system characteristic set utilized by a processing system;
    determining a first offset value of the set of offset values corresponding to the first processing system characteristic set;
    adjusting a delay value representative of a delay to a predetermined phase location based on the first offset value to generate an adjusted delay value; and
    adjusting a strobe signal received from a DDR memory based on the adjusted delay value to generate a delayed strobe signal.

11. The method of claim 10, further comprising:
    using a first edge of a first pulse of the delayed strobe signal to latch a first data value of a data signal received from the DDR memory; and
    using a second edge of the first pulse of the delayed strobe signal to latch a second data value of the data signal received from the DDR memory.

12. The method of claim 10, further comprising:
    determining the set of offset values based on performance analyses of the plurality of processing system characteristic sets.

13. The method of claim 10, wherein the plurality of processing characteristic sets comprise at least one of DDR memory configuration characteristics or host performance characteristics.

14. A device comprising:
    a first input to receive a first data signal from a dual data rate (DDR) memory;
    a second input to receive a first strobe signal from the DDR memory;
    a first storage location to store an offset value;
    a delay calculation module to determine a first delay value representative of a delay to a predetermined phase location of the first strobe signal;
    a delay adjustment module having an input to receive the first strobe signal, an input to receive the offset value from the first storage module, an input to receive the first delay value and an output to provide a second strobe signal, the second strobe signal representing the first strobe signal delayed based on the first delay value and the offset value; and
    a first latch having an input to receive the first data signal, an input to receive a first latching event based on a first edge of a first pulse of the second strobe signal, and an output to provide a first data value of the first data signal latched by the first latching event.

15. The device of claim 14, further comprising:
    a second latch having an input to receive the first data signal, an input to receive a second latching event based on a second edge of the first pulse, and an output to provide a second data value of the first data signal latched by the second latching event.

16. The device of claim 14, wherein the delay offset module comprises:
    a delay locked loop comprising:
      a plurality of delay elements in series, wherein a number of enabled delay elements may be dynamically configured; and
      a register to store the number of enabled delay elements, wherein the number of enabled delay elements is representative of the first delay value.

17. The device of claim 14, wherein the first storage location comprises a programmable register.

18. The device of claim 17, further comprising:
a second storage location to store a set of offset values indexed to a plurality of dual data rate (DDR) memory configurations;
a system configuration module to:
  determine a first DDR memory configuration of the device;
  identify a first offset value of the set of offset values corresponding to the first DDR memory configuration; and
  provide the first offset value for storage in the first storage module.

19. The device of claim 14, further comprising:
a second storage location to store a second delay value;
  an output buffer having an input to receive the second delay value, an input to receive a second signal, and an output to provide a third signal, the third signal representing the second signal delayed based on the second delay value.

* * * * *

UNITED STATES PATENT AND TRADEMARK OFFICE
CERTIFICATE OF CORRECTION

| | | |
|---|---|---|
| PATENT NO. | : 7,187,598 B1 | Page 1 of 1 |
| APPLICATION NO. | : 11/098873 | |
| DATED | : March 6, 2007 | |
| INVENTOR(S) | : Daniel E. Daugherty et al. | |

It is certified that error appears in the above-identified patent and that said Letters Patent is hereby corrected as shown below:

Column No. 1, Line No. 30, change "device; and" to --device;--

Column No. 1, Line No. 33, change "information." to --information; and--

Column No. 8, Line No. 22, change "analyses of the plurality of processing" to --analyses of processing--

Signed and Sealed this

Second Day of October, 2007

JON W. DUDAS
*Director of the United States Patent and Trademark Office*